United States Patent
Kim et al.

(10) Patent No.: US 8,047,718 B2
(45) Date of Patent: Nov. 1, 2011

(54) BEARING DEVICE FOR ROLL OF HOT DIPPING BATH IN CONTINUOUS HOT DIP COATING LINE

(75) Inventors: Gun-Young Kim, Kyungsangbook-do (KR); Yung-Up Kim, Kyungsangbook-do (KR); Hong-Jong Yoo, Kyungsangbook-do (KR); Gyn-Sam Hwang, Kyungsangbook-do (KR)

(73) Assignee: Posco, Pohang, Kyungsangbook-do (KR)

( * ) Notice: Subject to any disclaimer, the term of this patent is extended or adjusted under 35 U.S.C. 154(b) by 657 days.

(21) Appl. No.: 12/097,752

(22) PCT Filed: Dec. 15, 2006

(86) PCT No.: PCT/KR2006/005494
§ 371 (c)(1),
(2), (4) Date: Aug. 21, 2008

(87) PCT Pub. No.: WO2007/073060
PCT Pub. Date: Jun. 28, 2007

(65) Prior Publication Data
US 2009/0028478 A1    Jan. 29, 2009

(30) Foreign Application Priority Data
Dec. 23, 2005 (KR) .................. 10-2005-0128493

(51) Int. Cl.
*F16C 23/06* (2006.01)
*F16C 25/06* (2006.01)

(52) U.S. Cl. ........ 384/206; 384/192; 384/203; 384/906; 118/400

(58) Field of Classification Search ............... 384/153, 384/192, 203–206, 208, 276, 283, 291, 322, 384/418, 558, 906; 118/419, 423, 420, 400; 266/239
See application file for complete search history.

(56) References Cited

U.S. PATENT DOCUMENTS

| | | | | |
|---|---|---|---|---|
| 3,595,207 A | * | 7/1971 | Stricker | 118/420 |
| 3,796,471 A | * | 3/1974 | Holm | 384/558 |
| 3,936,102 A | * | 2/1976 | Riegler et al. | 384/206 |
| 4,337,699 A | * | 7/1982 | Beisel | 101/348 |
| 5,000,584 A | * | 3/1991 | Simmons | 384/291 |
| 5,072,689 A | * | 12/1991 | Nakagawa et al. | 384/283 |
| 5,230,580 A | * | 7/1993 | Henkel | 384/206 |

(Continued)

FOREIGN PATENT DOCUMENTS
DE         2913708 A  * 10/1980
(Continued)

*Primary Examiner* — Marcus Charles
(74) *Attorney, Agent, or Firm* — McDermott Will & Emery LLP

(57) ABSTRACT

In a bearing device for a roll of a hot dipping bath, i.e., zinc pot, a sleeve is fastened to a shaft of the roll of the hot dipping bath in a continuous hot dip coating line, i.e., a continuous galvanizing line. A bush housing has a bush internally fixed to support the sleeve, and a curved annular outer surface. Also, bush housing fixed rings are fixed to both inner sides of a fixed ring housing which is associated with a rig of the hot dipping bath roll. Each of the bush housing fixed rings has a curved annular inner surface supporting the bush housing at both sides thereof and in abutment with the curved annular outer surface of the bush housing. The invention allows the steel sheet to be coated with molten metal stably and speedily with high efficiency. Also, the bush and sleeve of the bearing device are not locally worn away, thereby extending useful life of the roll.

10 Claims, 8 Drawing Sheets

U.S. PATENT DOCUMENTS

| | | | |
|---|---|---|---|
| 5,364,191 A * | 11/1994 | Gruber | 384/203 |
| 5,549,393 A | 8/1996 | Morando | |
| 5,702,187 A | 12/1997 | Weigand et al. | |
| 5,718,517 A * | 2/1998 | Morando | 384/208 |
| 5,915,842 A * | 6/1999 | Redinger | 29/898.049 |
| 5,954,880 A * | 9/1999 | Aoki et al. | 118/419 |
| 6,095,690 A * | 8/2000 | Niegel et al. | 384/293 |
| 6,238,096 B1 * | 5/2001 | Allen et al. | 384/495 |
| 6,719,945 B2 * | 4/2004 | Morando | 118/419 |
| 7,223,019 B2 * | 5/2007 | Hoppe | 384/206 |
| 7,476,033 B2 * | 1/2009 | Poloni et al. | 384/192 |
| 7,726,661 B2 * | 6/2010 | Orlowski et al. | 384/206 |
| 2003/0111777 A1 | 6/2003 | Morando | |

FOREIGN PATENT DOCUMENTS

| | | | |
|---|---|---|---|
| GB | 2112056 A * | | 7/1983 |
| GB | 2142990 A * | | 1/1985 |
| JP | 52-027943 | | 3/1977 |
| JP | 53-019086 | | 2/1978 |
| JP | 01-119048 | | 8/1989 |
| JP | 05-070915 | | 3/1993 |
| JP | 5-149329 | | 6/1993 |
| JP | 10-512655 | | 12/1998 |
| JP | 11-10209 | | 1/1999 |
| JP | 2005-248298 | | 9/2005 |
| KR | 2003-0048266 | | 6/2003 |
| WO | WO 2005/031178 | | 4/2005 |

* cited by examiner

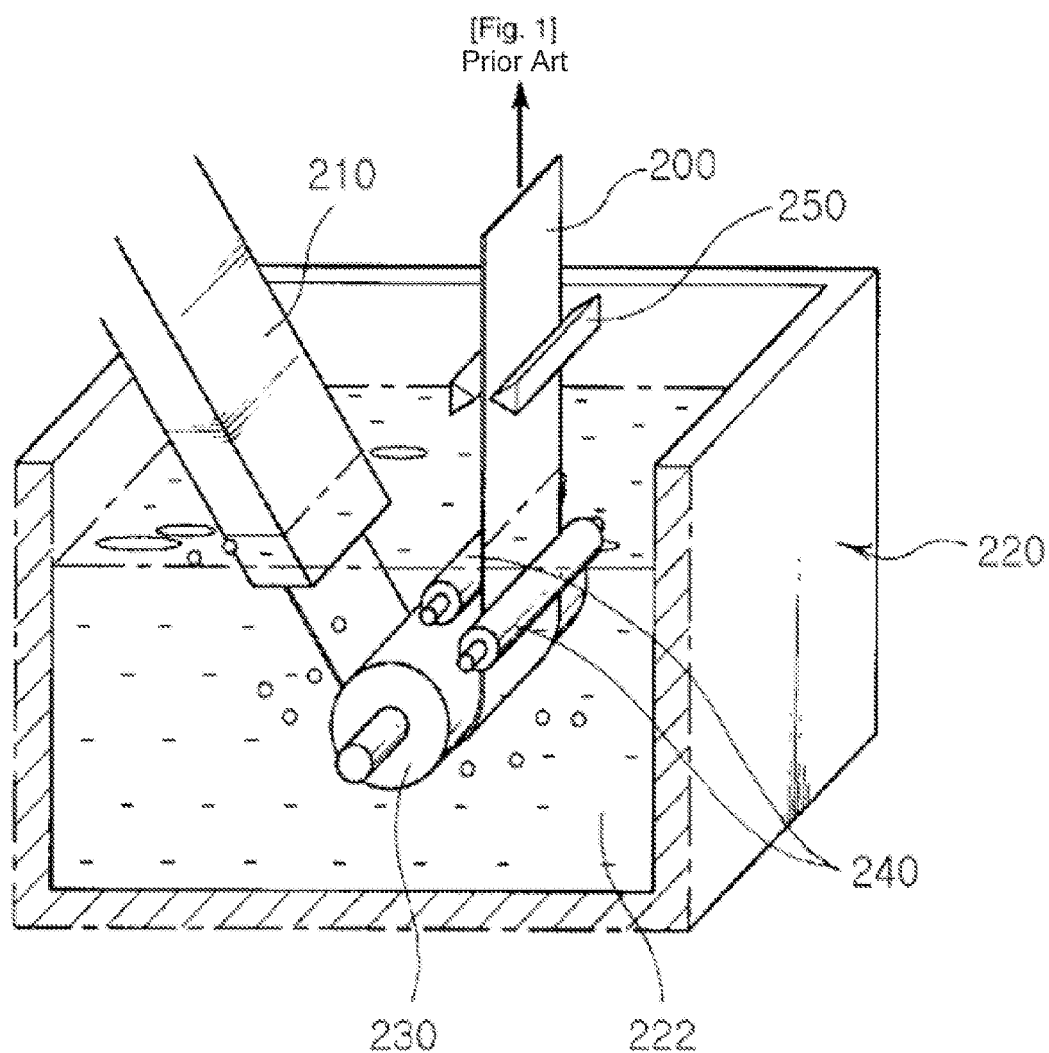
[Fig. 1]
Prior Art

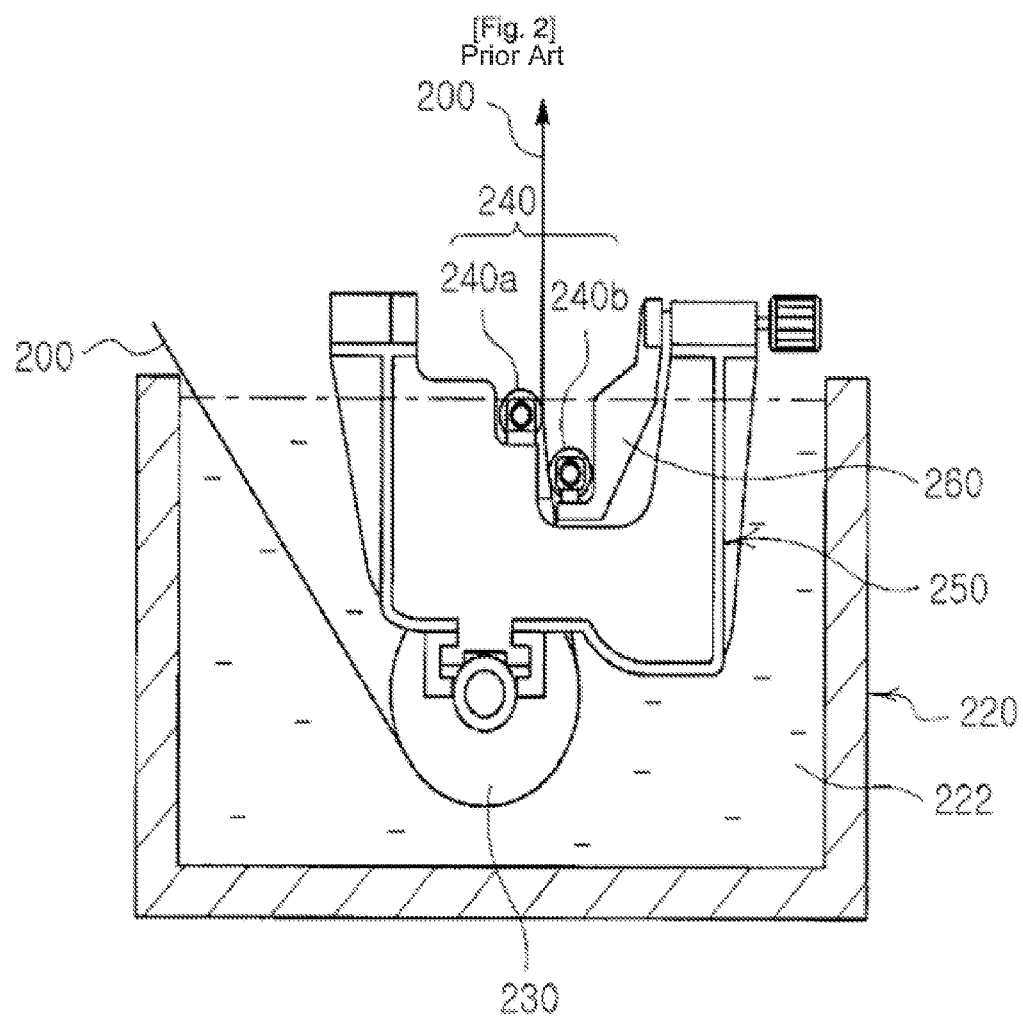

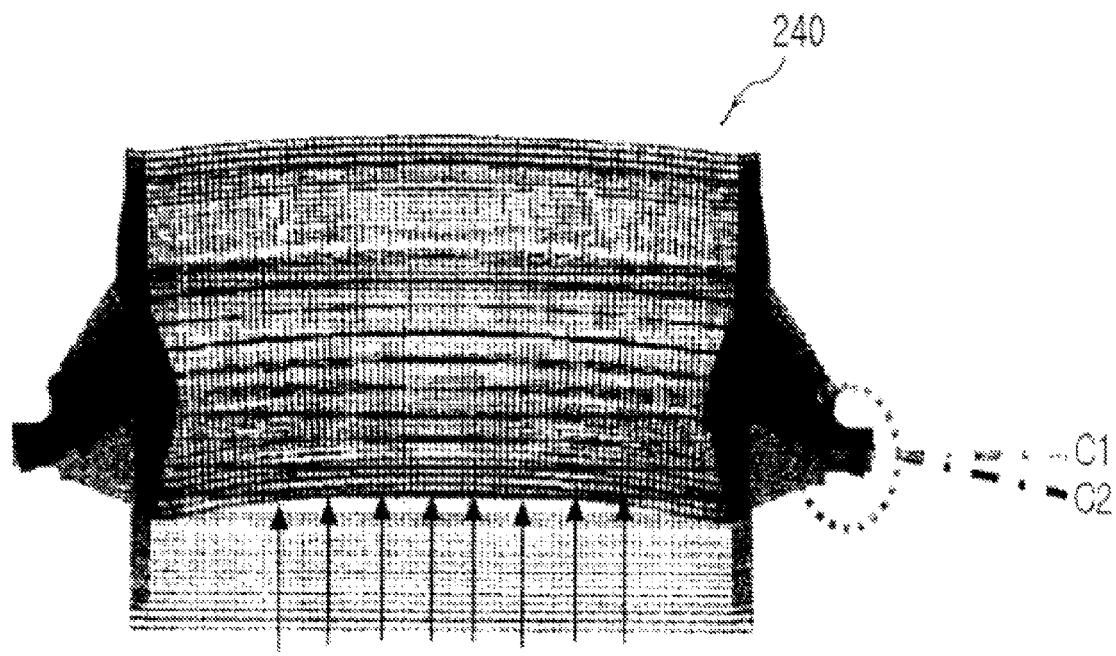
[Fig. 3]
Prior Art

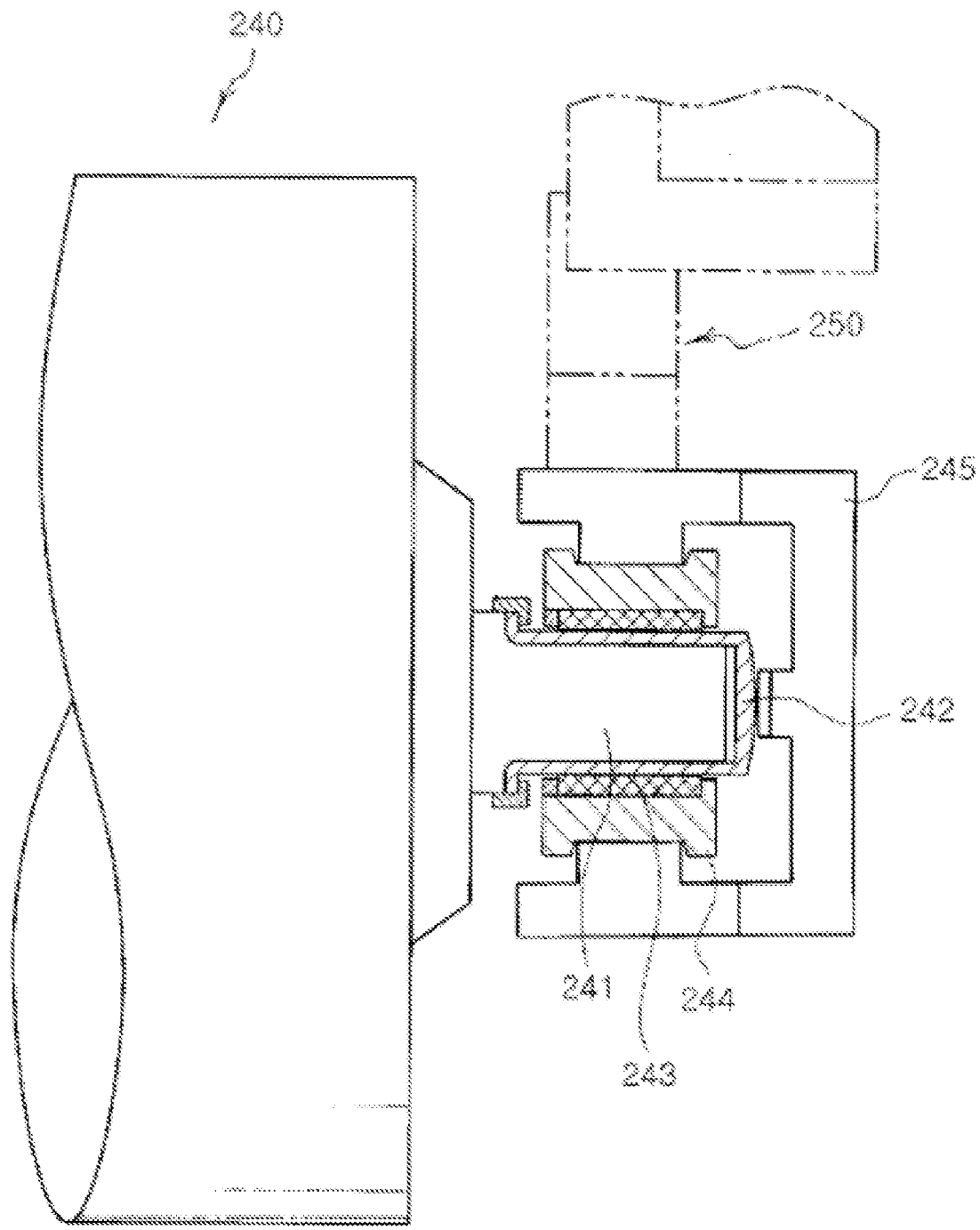

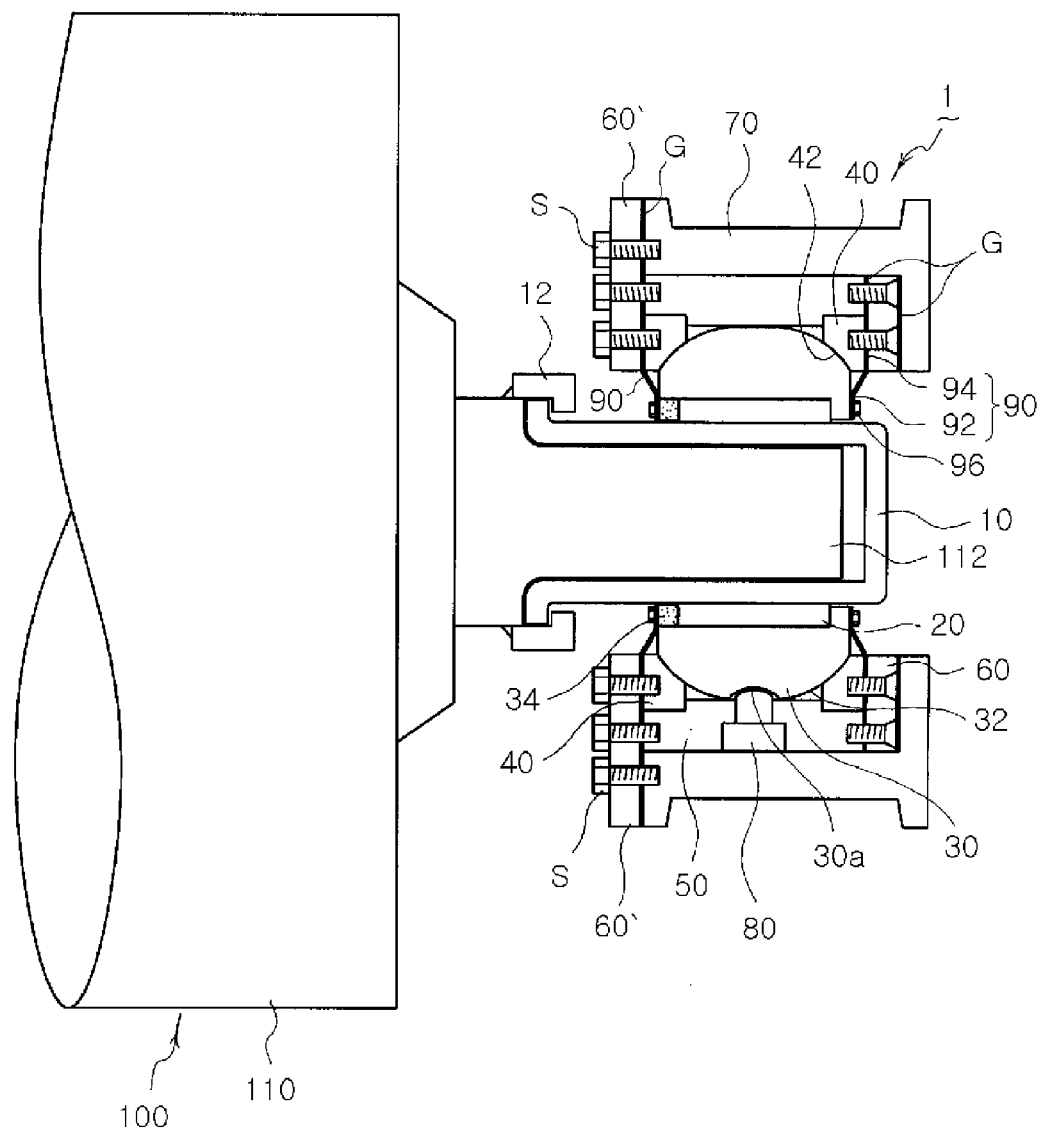
[Fig. 5]

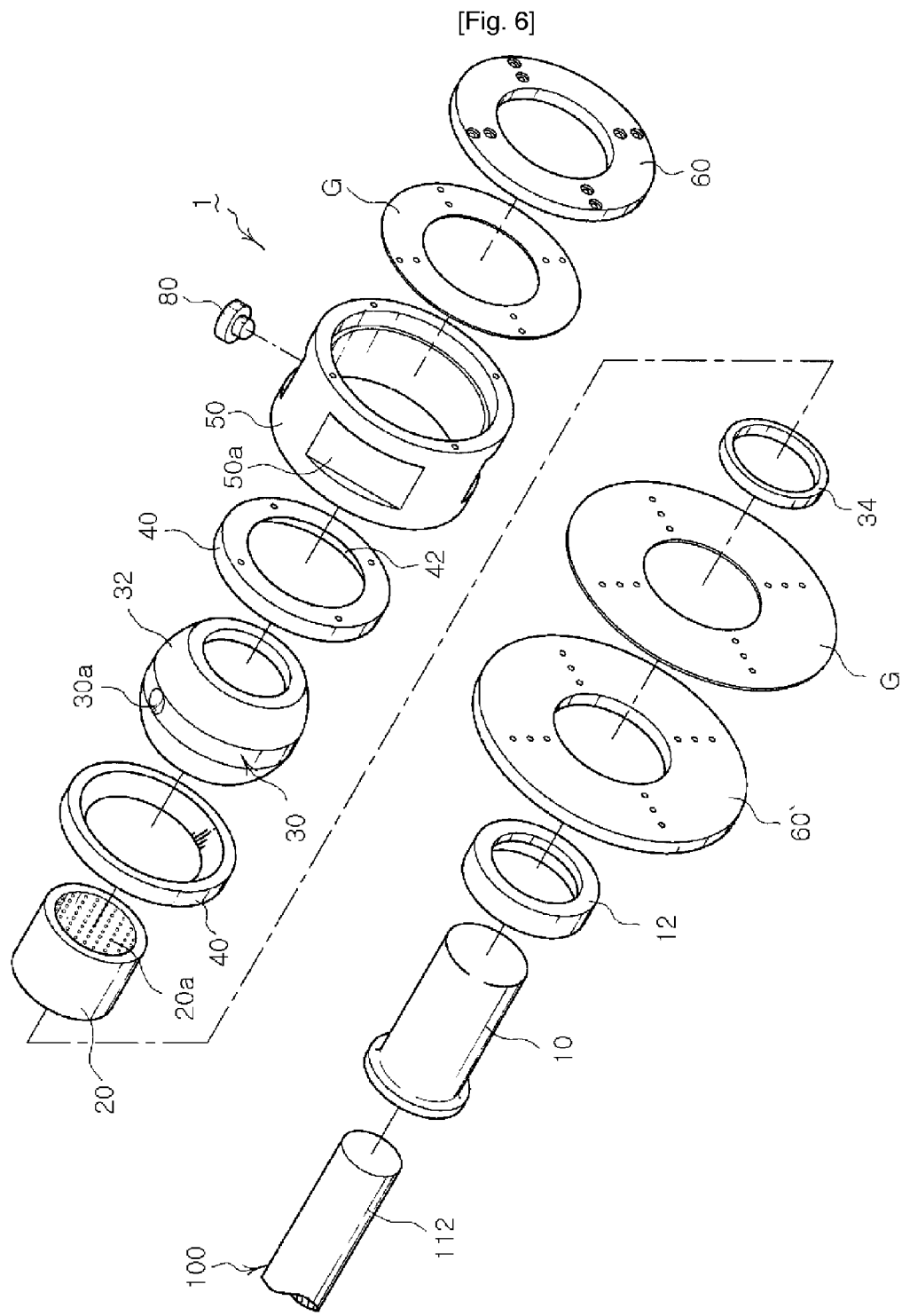
[Fig. 6]

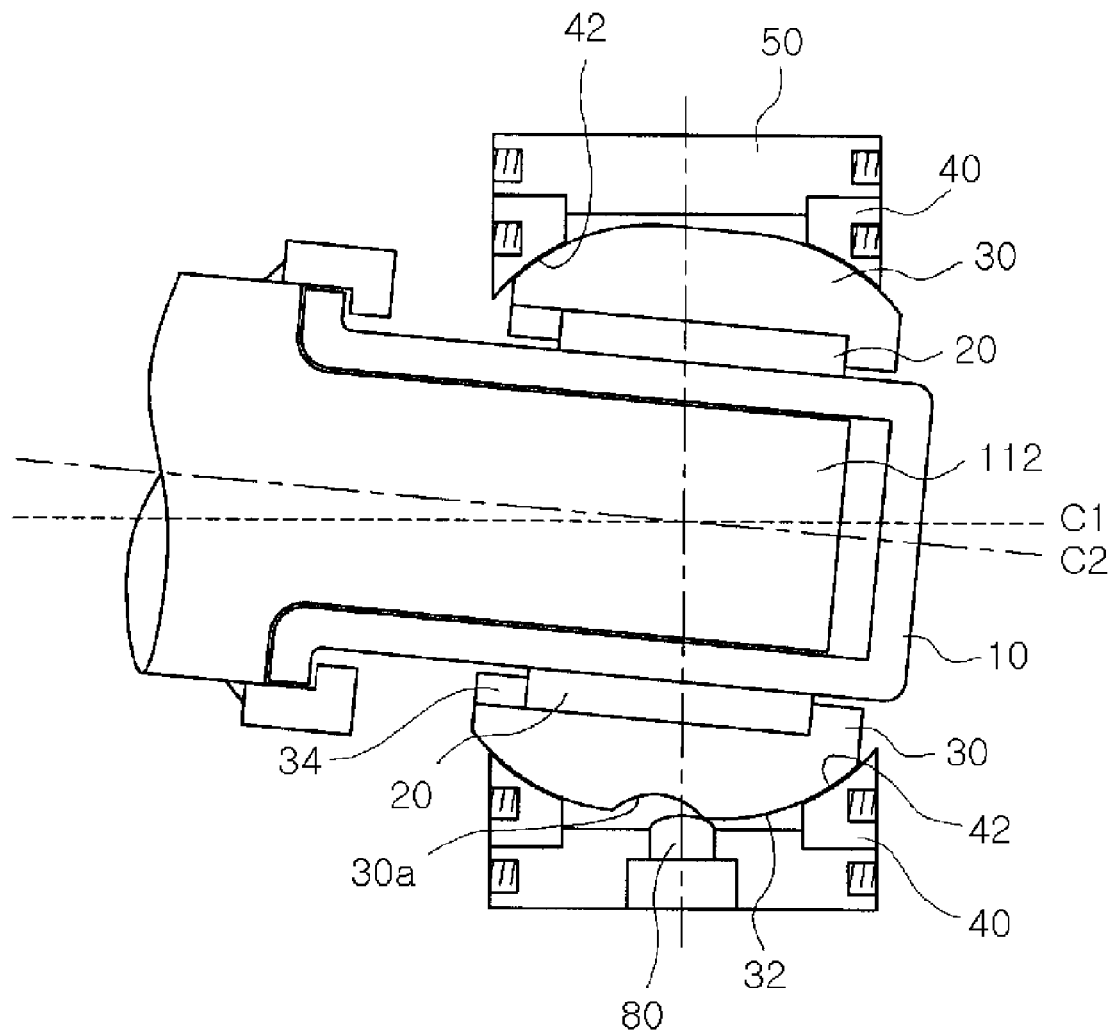

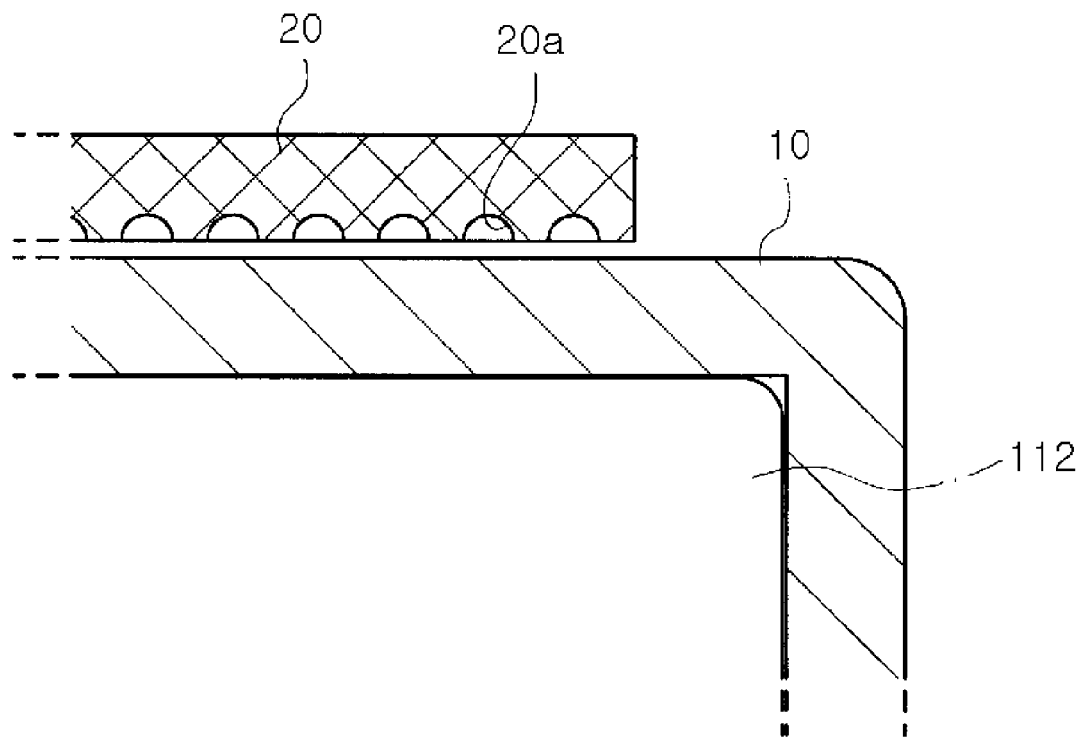
[Fig. 8]

BEARING DEVICE FOR ROLL OF HOT DIPPING BATH IN CONTINUOUS HOT DIP COATING LINE

TECHNICAL FIELD

The present invention relates to a roll of a hot dipping bath such as a stabilizing roll which is submerged in the hot dipping bath for coating a steel sheet with molten metal to support a transferred steel sheet.

More particularly, the present invention relates to a bearing device for a roll of a hot dipping bath, i.e., a roll of a zinc pot in a continuous galvanizing line which effectively prevents vibration of a bearing part caused by local wear of parts thereof to ensure faster coating of the steel sheet, extends useful life of the roll and enables higher quality coating of the steel sheet.

BACKGROUND ART

In general, another second metal layer is plating on a metal steel sheet by electrical-chemical treatment or using a hot dipping bath which has a second metal for coating molten therein and then a steel sheet submerged therein.

A representative molten metal coating adopts galvanized steel sheet. That is, the steel sheet, to be galvanized, passes around rolls of a zinc pot roll filled with molten zinc.

Especially, a continuous galvanizing line (CGL) allows the steel sheet to continually pass around the zinc pot roll to have its surface coated with zinc.

A galvanized steel sheet was utilized as a construction material initially. However, recently the steel sheet has been more extensively used, for example, in various assortments of electronic products or automobile materials due to endurance of harsh process conditions and mass producibility thereof.

Therefore, with its use broadened to electronic products or automobile materials where surface quality is crucial, the steel sheet faces an increasingly higher standard for better hot dip coating, i.e., to enhance surface glossing, corrosion resistance, weldability or coatability.

FIG. 1 illustrates a roll of a zinc pot in a continuous galvanizing line (CGL) and internal equipment thereof.

That is, as shown in FIG. 1, a steel sheet 200 is continuously supplied from a pay-off reel (not illustrated) to be connected to a heating chamber and induced to the zinc pot (bath) 220 filled with molten zinc 222 through a snout 210 immersed below a molten level of the zinc pot 220.

Also, the steel sheet 200 starts to pass perpendicularly toward an upper part of the zinc pot by virtue of the zinc pot roll immersed in the zinc pot 220, i.e., a sink roll 230 and stabilizing rolls 240 disposed just there over.

That is, the molten zinc 222 filled in the zinc pot 220, is attached and coated onto a surface of the steel sheet 200.

Here, the steel sheet 200 that passes around the sink roll 230 passes between the pair of stabilizing rolls 240 disposed just there over and these stabilizing rolls serve to prevent warping of the steel sheet.

Then, the steel sheet 200 passes between a pair of air knives 250 disposed just above the molten level of the zinc pot, thereby adjustably attached with molten zinc.

Then, the steel sheet is cold solidified and wound into a coil through a tension reel (not illustrated).

Therefore, the sink roll 230 and stabilizing rolls 240 of FIG. 1 are submerged in molten zinc (molten metal) of the zinc pot (hot dipping bath). The sink roll 230 and stabilizing rolls 240 guide a direction of the passing steel sheet 200 or corrects bending of the steel sheet which occurs when the steel sheet submerged in a high temperature zinc pot (zinc bath) emerges over the molten level.

For example, as shown in FIG. 1, the steel sheet 200 is connected to the heating chamber and passes through a sealed tube type of snout 210 which is submerged in the molten level of the zinc pot. Subsequently, the steel sheet 200 changes its motion toward a perpendicular upward direction due to the sink roll 230. Then the pair of stabilizing rolls 240 disposed just over the sink roll 230 imposed pressure on front and back surfaces of the steel sheet 200 transferred there between.

Accordingly, the sink roll 230 and the stabilizing rolls 240 suppress warping, distortion, inflection or vibration of the hot steel sheet 200.

Yet the zinc pot roll (sink roll 230 and stabilizing rolls 240) is different from a driving roll. That is, the zinc pot roll is immersed in the zinc pot 220 filled with hot molten zinc having a temperature of about 450° C. to 460° C. to operate while the driving roll runs at a room temperature.

Also, the zinc pot roll is not driven by a separate driving source, and rotated by a force of the transferred steel sheet, contacting the steel sheet without being powered. Therefore, tension load varies with thickness and width of the passing steel sheet 200.

Meanwhile, referring to FIG. 1, the sink roll 230 is spaced apart from a deviation roll (not illustrated) disposed over a cooling zone at a distance of 50 m to 60 m. This range of distance leads to loss of tension or inaccuracy of transfer of the steel sheet, thereby causing the steel sheet to vibrate severely.

Accordingly, the stabilizing rolls 240 installed just over the sink roll 230 critically serve to correct vibration or deformation such as inflection of the steel sheet when transferred.

However, the steel sheet produced by the steel manufacturer has various thickness and width ranging from 0.4 mm to 2.3 mm and 800 mm to 1860 mm, respectively. Thus one of the stabilizing rolls 240 (left side of FIG. 1) is fixedly disposed and the other one (right side of FIG. 1) is movably disposed.

For example, as shown in FIG. 2, one of the stabilizing rolls 240a is fixed to a rig 250, and the other one 240b is associated with a movable arm 260 which moves forward and backward by a driving source such as a hydraulic cylinder and a driving motor and installed on the rig so as to properly correct the steel sheet in accordance with thickness and width thereof.

Moreover, the sink roll 230 is engagingly disposed under the rig 250.

Thus, the rolls 230, 240a and 240b are introduced into or ejected from the zinc pot integrally with the rig 250.

But as shown in FIGS. 1 and 2, the stabilizing rolls having a smaller diameter and greater length than the sink roll are immersed in the molten metal 222 having a high temperature of at least 450° C. when rotating. Consequently, the stabilizing rolls are bent and deformed by tension of the steel sheet 200 and have a central line of the roll shaft inclined.

For example, FIG. 3 is a schematic diagram for analyzing actual load distribution of the stabilizing rolls 240 which are submerged in the zinc pot during operation.

As shown in FIG. 3, the stabilizing rolls with a shaft having a diameter of 50 mm to 70 mm keep a central shaft line of C1 before being affected by tension of the steel sheet and then have the central shaft line tilted toward C2 under influence of tension.

Then, FIG. 4 illustrates a conventional hot dipping bath roll in a continuous galvanizing line, especially stabilizing rolls 240 and a bearing part.

That is, as shown in FIG. 4, a bush 243 of the bearing part supporting a sleeve 242 fixed to a shaft 241 of the roll is fastened to a fixed bush housing 244. The fixed bush housing 244 is fixed onto a frame 245 associated with the rig 250 just described.

Accordingly, as shown in FIGS. 3 and 4, the stabilizing rolls in the conventional zinc pot tend to experience a tilt in their central shaft line owing to bending resulting from tension of the steel sheet. However, the bearing part cannot compensate for the inclination of the central shaft line.

For example, FIG. 4 illustrates a structure in which the bush 243 is formed integral with the fixed bush housing 244. Here, the sleeve 242 of the roll shaft 241 is in local contact with the bush 243 and thus easily inserted thereinto.

Therefore, the roll shaft rotated increases local friction between the sleeve and bush so that the roll itself fails to rotate smoothly.

Moreover, stiff rotation of the roll shaft 241 causes a skid in a contact area between the stabilizing rolls 240 and the steel sheet 200.

As a result, the slide between the steel sheet and the rolls leads to surface defects of the steel sheet.

The zinc pot rolls, i.e., zinc pot rolls such as the sink roll or stabilizing rolls rotate only by friction between the steel sheet and the roll surfaces in the zinc pot 220 filled with molten metal without a separate driving source. Thus, the stabilizing rolls rotate with reduced rotation force owing to viscous resistance or sliding friction of the roll bearing part.

Typically, viscous resistance and sliding friction are proportionally increased by relative velocity of an object. Therefore, the zinc pot roll is rotatable only when friction between the steel sheet and the roll surface is greater than the sum of viscous resistance and sliding friction of the bearing part.

In an actual assembly line of the steel manufacturing, the steel sheet 200 passes the zinc pot faster to increase production speed of the hot dip coated, i.e., galvanized steel sheet. But resistance friction as just described surpasses rotation force, thereby causing a skid between the roll and steel sheet. That is, the steel sheet to be galvanized in the zinc bath can hardly move faster in the actual assembly line.

Consequently in the zinc pot roll, as shown in FIG. 3, it is imperative to correct bending of the rolls and prevent local contact between the sleeve and bush.

Although not illustrated in a separate drawing, another conventional bearing part of a hot dipping bath roll is disclosed in U.S. Pat. No. 5,549,393 to overcome problems associated with such a conventional hot dipping bath roll.

For example, although not illustrated in a separate drawing, FIG. 6 of the U.S patent teaches a hot dipping bath roll which includes a retainer, a sleeve and a bearing ring. The retainer has a spherical annular convex surface. The sleeve has a frusto-conical concave annular surface which movably supports a left annular outer surface of the retainer and is supported by a housing. The bearing ring has an annular concave frusto-conical surface which movably supports a right annular outer surface of the retainer.

Therefore, in the roll according to the aforesaid document, the spherical annular convex surface of the retainer is in point contact with the frusto-conical concave annular surface of the sleeve (by the frusto-conical concave annular surface). Thus, practically, a contact area between the retainer and sleeve sustains load intensively, thereby resulting in local deformation.

In addition, sliding friction arising between the retainer and sleeve brings about local friction, thereby aggravating vibration of the roll rotated.

DISCLOSURE OF INVENTION

Technical Problem

The present invention has been made to solve the foregoing problems of the prior art and it is therefore an object of the present invention to provide a bearing device for a roll of a hot dipping bath in a continuous hot dip coating line which prevents eccentric spacing or eccentric rotation despite long-time use, thereby suppressing vibration of a steel sheet resulting from wobbling of a roll shaft and allowing the steel sheet to be coated smoothly even during fast transfer thereof.

Technical Solution

According to an aspect of the invention for realizing the object, there is provided a bearing device for a roll of a hot dipping bath, comprising: a sleeve fastened to a shaft of the hot dipping bath roll in a continuous hot dip coating line; a bush housing having a bush internally fixed to support the sleeve, and a curved annular outer surface; and bush housing fixed rings fixed to both inner sides of a fixed ring housing which is associated with a rig of the hot dipping bath roll, each of the bush housing fixed rings having a curved annular inner surface supporting the bush housing at both sides thereof and in abutment with the curved annular outer surface of the bush housing.

Preferably, the curved annular outer surface of the bush housing is convex spherical surface and the curved annular inner surface of the fixed ring is concave spherical surface to be in surface contact with the convex spherical surface of the bush housing.

Preferably, the bearing device further includes a bush housing ring engaged with an end of the bush housing to fix the bush.

More preferably, the bearing device further includes a buffer film interposed between the bush housing and the housing ring and between the bush housing and an edge of the bush.

The bearing device further includes inner and outer fixed rings and a shell housing disposed at both sides of and fixed to the fixed ring housing and the bush housing fixed rings, the shell housing fixedly engaging with the rig of the hot dipping bath roll.

Preferably, the bearing device further includes gaskets interposed between the inner fixed ring and the shell housing and between the outer fixed ring and the shell housing to block molten metal from penetrating inside.

The bearing device further includes a fixed pin inserted through the fixed ring housing and into a pin hole of the bush housing to prevent wear resulting from rotation of the bush housing.

Also, the bearing device further includes first and second cover members covering from a lower end of the bush housing to the bush housing fixed rings to block molten metal from penetrating inside.

Preferably, the first cover member has an inner side fixed to the bushing housing and an outer side fixed between the bush housing ring and the inner fixed ring and the second cover member has an inner side fixed to the opposing bush housing fixed ring and an outer side fixed between the bush housing fixed ring and the outer fixed ring.

Preferably, the bush has dents formed in an inner surface thereof to form a lubricant film for the sleeve.

Here, the roll of the hot dipping bath comprises a stabilizing roll for supporting a steel sheet below an air knife when the steel sheet passes around the roll sunk in the hot dipping bath.

ADVANTAGEOUS EFFECTS

As set forth above, according to preferred embodiments of the invention, the following advantages can be attained from a bearing part of a roll of a hot dipping bath, i.e., a zinc pot roll in a continuous hot dip coating line, i.e., a continuous galvanizing line.

First, the roll can rotate faster to enhance productivity of the coated steel sheet.

Also, according to the invention, the bush and the sleeve in surface contact cause wear to occur not locally but uniformly across a contact area, thereby leading to less wear and smaller depth of wear.

Therefore, despite long use of the bearing device, the bush and sleeve are reduced in wear and kept spaced from each other as initially set. This diminishes vibration of the steel sheet caused by eccentric rotation of the roll and accordingly enhances hot dip coating quality, i.e., galvanizing quality.

In addition, the invention decreases vibration of a frame such as the roll rig, assuring long assembling jobs to be carried out under good conditions.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a conventional zinc pot in a continuous galvanizing line and internal equipment thereof;

FIG. 2 is a front elevation view illustrating a conventional zinc pot roll;

FIG. 3 is a schematic view illustrating shaft deviation of a conventional zinc pot roll;

FIG. 4 is a configuration view illustrating a conventional stabilizing roll and a bearing part;

FIG. 5 is a configuration view illustrating a stabilizing roll and a bearing part according to the invention;

FIG. 6 is a partial exploded perspective view of FIG. 5;

FIG. 7 is an operational view illustrating shaft deviation of a roll of a zinc pot according to the invention; and FIG. 8 is a configuration view illustrating deformation of a bush in a bearing device for a roll of a zinc pot according to the invention.

MODE FOR THE INVENTION

Preferred embodiments of the present invention will now be described in detail with reference to the accompanying drawings.

First, FIGS. 5 to 7 illustrate a bearing device 1 for rotatably supporting a shaft of a roll of a hot dipping bath, i.e., zinc pot in a continuous hot dip coating line, i.e., a continuous galvanizing line, especially stabilizing rolls.

The bearing device 1 of the zinc pot roll of the invention, as shown in FIGs. includes a sleeve 10, a bush housing 30, bush housing fixed rings 40. The sleeve 10 is fastened to a shaft 112 of the roll. The bush housing 30 has a bush 20 internally fixed to support the sleeve 10, and a curved annular surface 32. The bush housing fixed rings 40 are fixed to both inner sides of a fixed ring housing 50 which is associated with a rig of the zinc pot roll. Each of the bush housing fixed rings 40 has a curved annular inner surface 42 supporting the bush housing 30 at both sides thereof and in abutment with the curved annular outer surface of the bush housing 30.

In the bearing device of the invention, the bush 20 for supporting the sleeve 10 with which the roll shaft 112 is slidably engaged is inserted into an inner circumference of the bush housing 30. Here, the bush housing 30 has a convex spherical outer surface 32 as shown in FIG. 6.

The bush housing fixed rings 40 in abutment therewith have a concave spherical inner surface 42 to be in surface contact with the convex spherical outer surface 32 of the bush housing 30 although the center of the roll shaft shifts toward the spherical surface unlike the prior art.

That is, as shown in FIG. 7, in the bearing device of the roll of the zinc pot of the invention, during passing of the steel sheet, the convex spherical outer surface 32 of the bush housing 30 makes surface contact with the concave spherical inner surface of the bush housing fixed rings 40. Otherwise, the steel sheet may be bent due to tension thereof in the zinc pot roll filled with hot molten zinc as shown in FIG. 3.

Therefore, although a central line of the roll shaft shifts from C1 to C2 as shown in FIG. 3, friction does not take place locally and intensively between the sleeve and the bush, but uniformly across a contact area thereof. This restrains uneven wear, which is most problematic in the conventional bearing part.

Here, as shown in FIGS. 6 and 7, most preferably, the bush housing 30 has a convex spherical outer surface 32 and the bush housing fixed ring 40 has a concave spherical inner surface. Accordingly the inner surface of the bush housing fixed rings 40 achieves surface contact with the outer surface of the bush housing 30 against friction resistance.

In the end, according to the invention, as opposed to the point contact made in the conventional molten roll, the outer surface 32 of the bush housing 30 forms a complete surface contact with the inner surface of 42 of the bush housing fixed rings 40. This causes abrasion to occur not locally but entirely across the surface, thereby reducing wobbling of the rolls resulting from local abrasion.

Also, as shown in FIGS. 5 and 6, preferably, a buffer film (not illustrated) is interposed between the bush housing ring 34 and a side of the bush in the vicinity of the bush housing ring 34.

Such a buffer film serves to protect the bush 20 which is highly wear-resistant but modestly vulnerable to impact, from thermal deformation or impact load.

Furthermore, as shown in FIGS. 5 and 6, the fixed ring housing 50 and the bush housing fixed rings 40 fixed to both inner sides of the fixed ring housing 50 are fastened to inner and outer fixed rings 60, 60' and a shell housing 70. The inner and outer fixed rings 60, 60' are disposed at both sides of the fixed ring housing 50 and the shell housing 70 is fixedly engaged with a rig of the roll of the zinc pot (reference sign 250 of FIG. 2).

Also, referring to FIG. 5, about four concave surfaces 50a are machined on an outer surface of the fixed ring housing 50 at a uniform distance. These surfaces 50a serve as an area for ensuring easy assembling with the shell housing 70.

Meanwhile, as shown in FIG. 6, preferably, gaskets G are interposed between the inner fixed ring 60 and the shell housing 70, between the outer fixed ring 60' and the shell housing 70 and between the bush housing fixed ring 40 and the fixed ring housing 50. The gaskets G block molten metal from penetrating inside.

For example, the gaskets G impede the molten metal from penetrating between the fixed rings and housings, thereby ensuring easy dissembling and re-assembling of the bearing device at a room temperature to be recycled.

Moreover, as shown in FIGS. 5 and 6, a fixed pin 80 is inserted through the fixed ring housing 50 and into the bush housing 30 to prevent the bush housing from spinning.

That is, as shown in FIG. 6, the fixed pin 80 is threadably mounted in a pin hole 30a formed in a central portion of the outer surface of the bush housing.

The fixed pin 80 accordingly prevents wear that may arise from a slide between the bush housing 30 and the bush housing fixed ring 40.

For example, the conventional bearing device disclosed in the U.S patent described above does not have such a fixed pin structure, thereby potentially leading to a slide between housing for fixing a bush and a retainer for fixing the housing.

That is, referring to FIG. 5, with the roll shaft 112 rotating, the bush and the bush housing formed integrally rotate along the roll shaft by friction of the bush 20 and the sleeve 10. This causes sliding wear between the spherical surface of the bush housing 30 and that of the bush housing fixed ring 40. The wear may be worsened to further distance the bushing housing 30 from the bush housing fixed ring 40, thereby wobbling the bush 20.

Therefore, preferably, to prevent spinning of the bush housing, the pin hole 30a (FIG. 7) is formed on the bush housing 30 to have the fixed pin 80 inserted thereinto.

Meanwhile, the fixed pin 80 constrains the bush housing, keeping it from spinning beyond a predetermined range (e.g., 2° to 3°).

Therefore, the bush housing (or block) constrained within a predetermined range renders a limited portion worn away with respect to the shaft. Thus, the bush housing can be installed at a different angle after a spell of work to reuse an inner surface of the bush. This allows the bush to be recycled at least four times.

That is, with a central line of the roll shaft shifting from C1 to C2, the sleeve 10 and the bush 20 contact limitedly. Thus the pin hole can be positioned adjustably in assembling the bush housing. This changes a contact area between the bush and the sleeve, thereby extending useful life of the bush.

Meanwhile, as shown in FIG. 5, cover members 90 are disposed to cover from a lower end of the bush housing 30 to the bush housing fixed rings 40.

Here, as shown in FIG. 5, one of the cover members 90 has an inner side screwed to the bushing housing 30 by a fixed bolt 96 and an outer side fixed between the bush housing ring 30 and the inner fixed ring 60. Likewise, the other cover member 90 has an inner side screwed to the opposing bush housing fixed ring 40 by the fixed bolt 96 and an outer side fixed between the bush housing fixed ring 40 and the outer fixed ring 60'.

That is, the cover members have an inner side shaped as an inwardly concave ring to be attached to both sides of the bearing part. Such cover members 90 are made of a heat-resistant material, e.g., SUS 316L.

As shown in FIG. 5, the cover members 90 block molten metal such as molten zinc or metal compounds such as dross from penetrating between the bush housing 30 and the bush housing fixed ring 40.

Therefore, this overcomes the following problem arising when the bearing device of the roll is re-assembled at a room temperature for recycling. That is, in a case where molten metal or metal compounds penetrate around a surface contact area between the spherical outer surface 32 of the bush housing and the spherical inner surface 42 of the bush housing fixed ring, the molten metal and metal compounds that have penetrated stick to the spherical outer surface 32 and the spherical inner surface 42.

The molten metal, once penetrated and stuck, is hardly removed by cleaning or heating at a temperature higher than a melting point. Consequently in case of recycling of the bearing part, at least a whole bush block of the bush, bush housing and the fixed ring should be dissembled and then re-assembled together.

Then, as shown in FIGS. 2 to 8, in the bearing device 1 of the roll of the zinc pot of the invention, dents 20a such as embossing are formed integrally in an inner surface of the bush 20 which abuts and supports the sleeve 10. The dents 20a also are filled with molten metal, i.e., molten zinc to provide a lubricant film for the sleeve 10.

That is, the bush of the invention is made of highly heat-resistant ceramics. Here, the dents 20a are arranged uniformly as shown in FIG. 2 in an inner surface of the bush 20, i.e., a surface area in contact with the sleeve 10 where the roll shaft 112 is assembled.

Accordingly, molten zinc is filled in the dents 20a between the bush 20 and the sleeve 10 which is rotatably supported by the bush 20 so as to push the sleeve 10. This increases lubrication and eventually decreases friction between the sleeve and the bush that directly affects revolution of the roll shaft.

The bearing device 1 of the zinc pot roll of the invention ensures the roll shaft to rotate very smoothly and minimizes factors for local wear, thereby preferably applicable to the zinc pot roll, especially the stabilizing rolls (reference sign 240 of FIGS. 2 and 3) which are susceptible to tension of the steel sheet and prone to warping in their shaft.

Therefore, the bearing device 1 of the invention enhances operability of the zinc pot roll 100 in the continuous galvanizing line.

Then an explanation will be given about assembling of the roll shaft of the roll bearing device 1 of the invention described above. As shown in FIGS. 5 and 6, first, the highly wear-resistant sleeve 10 is inserted into the roll shaft 112 formed integral with the roll body 110 of the roll 100 to protect the shaft from skidding wear. Then a sleeve ring 12 (see FIGS. 5 and 6) is fixedly welded to the roll shaft 112 not to be disengaged from the shaft.

Subsequently, the bush 20 for supporting the sleeve 10 having the roll shaft inserted thereinto is shrink-fitted to the bush housing 30, which is fastened by welding. Here, the bush 20 is made of a ceramic material having excellent wear resistance and uniform friction interface.

Also, as described above, the buffer film (not illustrated) is interposed between the bush housing ring and a side of the bush in the vicinity of the bush housing ring to relieve thermal deformation load resulting from differences in thermal expansion.

Moreover, the bush housing 30 and the bush housing fixed ring 40 and the fixed ring housing 50 are assembled as a block with the inner and outer fixed rings 60, 60' and the shell housing 70 by screws S. Here, as described above, the bush housing 30 has a convex spherical outer surface 32, and the bush housing fixed ring 40 has a concave spherical inner surface to be in surface contact with the convex spherical outer surface of the bush housing 30.

To facilitate dissembling, assembling and attaching/detaching of the bearing part, gaskets G are interposed between the internal fixed ring 60 and the shell housing 70 and between the outer fixed ring 60' and the shell housing 70 to prevent molten metal from penetrating inside. In addition, components are fastened via screws S to achieve more precise assembling.

Furthermore, the cover members 90 are disposed to cover from a lower end of the bush housing to the bush housing fixed rings to block molten metal from penetrating inside.

As a result, in the bearing device 1 of the zinc pot roll of the invention, the bush housing forms surface contact with the bush housing fixed ring, thereby compensating for any misalignment of a central shaft line of the zinc pot roll with respect to the central line of the bush. This prevents the roll from experiencing decline in rotation force resulting from increased friction. Notably, this prevents eccentric rotation of the roll, thereby suppressing vibration of the coated steel sheet caused by wobbling of the roll shaft.

While the present invention has been shown and described in connection with the preferred embodiments, it will be apparent to those skilled in the art that modifications and variations can be made without departing from the spirit and scope of the invention as defined by the appended claims.

The invention claimed is:

1. A bearing device for a roll of a hot dipping bath, in a continuous hot dip coating line comprising:
    a sleeve fastened to a shaft of the roll of the hot dipping bath;
    a bush housing having a bush internally fixed to support the sleeve, and a curved annular outer surface;
    bush housing fixed rings fixed to both inner sides of a fixed ring housing which is associated with a rig of the hot dipping bath roll, each of the bush housing fixed rings having a curved annular inner surface supporting the bush housing at both sides thereof and in abutment with the curved annular outer surface of the bush housing; and
    a fixed pin inserted through the fixed ring housing and into a pin hole of the bush housing to prevent wear resulting from rotation of the bush housing.

2. The bearing device according to claim 1, wherein the curved annular outer surface of the bush housing is convex spherical surface and the curved annular inner surface of the bush housing fixed ring is concave spherical surface to be in surface contact with the convex spherical surface of the bush housing.

3. The bearing device according to claim 1 or 2, further comprising a bush housing ring engaged with an end of the bush housing to fix the bush.

4. The bearing device according to claim 3, further comprising a buffer film interposed between the bush housing ring and a side of the bush in the vicinity of the bush housing ring.

5. The bearing device according to claim 1, further comprising inner and outer fixed rings and a shell housing disposed at both sides of and fixed to the fixed ring housing and the bush housing fixed rings, the shell housing fixedly engaging with the rig of the roll of the hot dipping bath.

6. The bearing device according to claim 5, further comprising gaskets interposed between the inner fixed ring and the shell housing and between the outer fixed ring and the shell housing to block molten metal from penetrating inside.

7. The bearing device according to claim 1, further comprising first and second cover members covering from a lower end of the bush housing to the bush housing fixed rings to block molten metal from penetrating inside.

8. The bearing device according to claim 7, wherein the first cover member has an inner side fixed to the bushing housing and an outer side fixed between the bush housing ring and the inner fixed ring and the second cover member has an inner side fixed to the opposing bush housing fixed ring and an outer side fixed between the bush housing fixed ring and the outer fixed ring.

9. The bearing device according to claim 1, wherein the bush has dents formed in an inner surface thereof to form a lubricant film for the sleeve.

10. The bearing device according to claim 1, wherein the roll of the hot dipping bath comprises a stabilizing roll for supporting a steel sheet below an air knife when the steel sheet passes around the roll sunk in the hot dipping bath.

* * * * *